Patented Oct. 27, 1953

2,657,178

UNITED STATES PATENT OFFICE 2,657,178

TREATMENT OF INDUSTRIAL WATERS

William W. Robinson, Jr., Hollywood, Calif., assignor to Texaco Development Corporation, New York, N. Y., a corporation of Delaware No Drawing. Application September 24, 1948, Serial No. 51,124

3 Claims. (Cl. 210—23)

This invention relates to the treating of industrial waters such as are used in swimming pools, and circulated through heat exchangers, cooling ponds, towers, and like apparatus.

Industrial waters that have been passed through heat exchangers and like devices for absorbing the heats of chemical reactions, sensible heats, latent heats, and the like, such as those occurring in the practice of distillation, cracking, fractionation, etc., are usually cooled and recycled for reuse. Cooling is most efficiently accomplished in the well known cooling tower wherein the water flows downwardly over a series of baffles and is subjected to contact with the atmosphere or in spray devices wherein the water is sprayed into the air and collected in a pond.

A material problem in the operation of such towers and other cooling devices is the growth of algae and similar organisms. Algae are very small and simple forms of plant life which usually combine in large masses, generally as stringy weed-like formations. Such formations attach themselves to any solid object with which the algae-containing water comes into contact. Other types of algae float and form the scum often seen on still water. Under favorable conditions of light and temperature, algae develop a very disagreeable odor.

Such algae constitute a major problem in the handling of industrial waters in that they tend to coat any surfaces they contact and tend to block pipes and passages. Mechanical cleaning is not always possible because of the many small and relatively inaccessible passages involved as in a heat exchanger, and the necessity for shutting down the equipment for the cleaning process. Other proposals such as keeping light away from the water, creating high velocity, turbulent flows, the periodic circulation of relatively hot water, and the use of electric currents have been generally unsuccessful. Chemical treatment has been proposed but thus far has not been entirely satisfactory because of the corrosive effect of the chemicals on the metal apparatus, toxicity, and danger in handling.

Like problems have been encountered in the treatment of swimming pool water, etc.

It is an object of this invention to provide a novel process wherein the growth of such algae and like organic matter is inhibited to an extent to eliminate the aforesaid disadvantages, the process being free of the disadvantages attendant upon prior processes.

Another object of the invention is to provide a novel type of cooling medium or industrial water wherein the growth of algae and the deposition of scale on the involved apparatus is inhibited.

Still another object of the invention is to provide a novel algicide.

Further objects and advantages of the invention will appear from the following description and claims.

In its broader aspect, the invention involves the treating of such industrial waters and kindred cooling mediums, with a compound or compounds capable of inhibiting the growth of algae and like organisms. More specifically, the invention involves the use of complex alkali metal heavy metal polyphosphates or reaction products of an alkali metal polyphosphate and a compound containing a heavy metal when caused to react in the stoichiometric proportions necessary to form such a complex polyphosphate. Such treatment is applicable to waters in general, such as are found in swimming pools, ponds, etc., when the algae problem may be present.

In describing the invention, reference is first made to a known complex alkali metal heavy metal polyphosphate, namely, sodium cupric polyphosphate, which is available commercially. This compound is considered to be of the probable formula $Na_2CuP_2O_7$.

Substantially equivalent compounds are found in the reaction products secured by combining approximately the proper stoichiometrical proportions of a polyphosphate selected from the left column of the following table and a metal compound selected from the right column:

| Polyphosphates | Heavy Metal Compounds |
|---|---|
| Sodium tetraphosphate $Na_6P_4O_{13}$ | $CuSO_4$ |
| Sodium triphosphate $Na_5P_3O_{10}$ | $AgNO_3$ |
| Sodium hexametaphosphate $Na_6P_6O_{18}$ | $HgCl_2$ |
| Sodium pyrophosphate $Na_4P_2O_7$ | $CdSO_4$ |
| Disodium dihydrogen pyrophosphate $Na_2H_2P_2O_7$ | $MnSO_4$ |
|  | $NiCl_2$ |
| Pyrophosphoric acid $H_4P_2O_7$ | $ZnSO_4$ |
| Polymetaphosphoric acids $(HPO_3)_x$ | $CuCO_3Cu(OH)_2$ Malachite |

While the sodium salts have been listed in the left column, it is to be understood that other salts of the alkali metals including the potassium and lithium salts may be used, as well as those ammonium salts which are sufficiently stable and the mixed salts thereof. The term alkali metal as used herein is intended to include the ammonium radical in such compounds. Likewise the various metals listed in the right column may be used with anions other than those listed, providing that no seriously detrimental or harmful reaction products are formed. The listed compounds are cited only as examples of some of the possible reactants. It will be noted that the metals included above are heavy metals as defined in Hackh's Chemical Dictionary, third edition.

In practicing a preferred embodiment of the invention, a compound from each of the above columns, for example $Na_4P_2O_7$ and $CuSO_4$ are mixed in approximately stoichiometric proportions to form a complex alkali metal heavy metal polyphosphate and the reaction products charged to the industrial water. Or in some cases, the initial compounds may be charged directly to the water in the desired proportions and the reaction products formed directly therein, providing no undesirable by-products are formed such as might be formed with components already present in the water. The first method is preferred because of the ability to better observe and control the reaction.

The following are listed as examples of known or possible reactions wherein the desired complex reaction products are secured, the character M representing the metal in a bivalent form. It is to be understood that the equations can also be written for such metals of other valences:

(1) $Na_4P_2O_7 + MSO_4 \rightarrow Na_2MP_2O_7 + Na_2SO_4$
(2) $Na_2H_2P_2O_7 + MSO_4 \rightarrow Na_2MP_2O_7 + H_2SO_4$
(3) $Na_6P_4O_{13} + MSO_4 \rightarrow Na_4MP_4O_{13} + Na_2SO_4$
(4) $Na_6P_4O_{13} + 2MSO_4 \rightarrow Na_2M_2P_4O_{13} + 2Na_2SO_4$
(5) $Na_6P_6O_{18} + MSO_4 \rightarrow Na_4MP_6O_{18} + Na_2SO_4$
(6) $Na_6P_6O_{18} + 2MSO_4 \rightarrow Na_2M_2P_6O_{18} + 2Na_2SO_4$
(7) $Na_5P_3O_{10} + MSO_4 \rightarrow Na_3MP_3O_{10} + Na_2SO_4$
(8) $Na_5P_3O_{10} + 2MSO_4 \rightarrow NaM_2P_3O_{10} + 2Na_2SO_4$
(9) Neutralization of polymeta and pyrophosphoric acids with varying amounts of metal carbonates, oxides, hydroxides, or mixtures thereof, to yield intermediate metallic acid salts together with sufficient quantities of basic alkali metal compounds in other forms.

Of the above, Equations 1, 3, 6, 7 and 9 are recognized reactions. Equation 2 is open to question as being exactly as represented since the reactions of Equations 1 and 2 with the same metallic salt sometimes give slurries of somewhat different solubilities. This may be only a pH effect due to the acid nature of the sodium acid pyrophosphate. In Equation 2 it is realized that a complex heavy metal acid polyphosphate may be formed as an intermediate of the product.

Equation 4 appears to be a sequestering reaction and in Equation 5 a partial saturation of the $Na_2[Na_4(PO_3)_6]$ formula may be correct or the reaction product may consist of a mixture of $Na_2M_2P_6O_{18}$ and unreacted $Na_6P_6O_{18}$.

Equation 8 is a possible reaction which could result in the formation of an equimol mixture of the neutral salt $M_5P_6O_{20}$ with the sequestering reaction product $Na_3MP_3O_{10}$.

In the experimental work, reaction products shown below (some perhaps hypothetical but nevertheless effective) were produced from the reactants indicated:

$Na_2CuP_2O_7$ (from 9.38 g. $Na_4P_2O_7$ and 8.80 g. $CuSO_4.5H_2O$)
$Na_3CuP_3O_{10}$ (from 9.54 g. $Na_5P_3O_{10}$ and 6.48 g. $CuSO_4.5H_2O$)
$Na_2Cu_2P_4O_{13}$ (from 9.30 g. $Na_6P_4O_{13}$ and 9.88 g. $CuSO_4.5H_2O$)
$Na_2Cu_2P_6O_{18}$ (from 9.46 g. $Na_6P_6O_{18}$ and 7.70 g. $CuSO_4.5H_2O$)
$Na_2CuP_2O_7$ (from 6.28 g. $H_4P_2O_7$, 3.90 g. $CuCO_3Cu(OH)_2$ and 1.87 g. $Na_2CO_3$)
$Na_2HgP_2O_7$ (from 6.32 g. $Na_4P_2O_7$ and 6.42 g. $HgCl_2$)
$Na_4HgP_4O_{13}$ (from 7.53 g. $Na_6P_4O_{13}$ (Quadrafos) and 4.35 g. $HgCl_2$)
$Na_2NiP_2O_7$ (from 9.54 g. $Na_4P_2O_7$ and 8.53 g. $NiCl_2.6H_2O$)
$Na_2Ag_4P_4O_{13}$ (from 5.81 g. $Na_6P_4O_{13}$ (Quadrafos) and 8.39 g. $AgNO_3$)
$Na_2Zn_2P_6O_{18}$ (from 9.40 g. $Na_6P_6O_{18}$ (Calgon) and 8.82 g. $ZnSO_4.7H_2O$)
$Na_3ZnP_3O_{10}$ (from 9.50 g. $Na_5P_3O_{10}$ and 7.42 g. $ZnSO_4.7H_2O$)
$Na_4ZnP_6O_{18}$ (from 9.69 g. $Na_6P_6O_{18}$ (Calgon) and 4.55 g. $ZnSO_4.7H_2O$)
$Na_2CdP_2O_7$ (from 6.68 g. $Na_2H_2P_2O_7$ and 6.27 g. $CdSO_4$)
$Na_2Cd_2P_6O_{18}$ (from 8.22 g. $Na_6P_6O_{18}$ (Calgon) and 5.59 g. $CdSO_4$)

In each case, the theoretical amounts of alkali metal polyphosphate and heavy metal salts which would react to form 10 grams of the complex were used. The polyphosphate was dissolved or suspended in 80 to 90 ml. distilled water, the metal salt added, and the mixture shaken until the reaction appeared to be complete. Distilled water was added to bring the volume up to 100 ml., all chemical additions thereafter being based on the premise that 100 ml. of the solution or slurry contained 10 grams of the desired reaction product, i. e., the complex.

The phrase "approximately stoichiometric proportions" as used herein is intended to include those proportions wherein the desired complex alkali metal heavy metal polyphosphate is formed such as $Na_2CuP_2O_7$, $Na_2Ag_4P_4O_{13}$ and $K_4HgP_4O_{13}$. This usually necessitates the use of a slight excess of the alkali metal polyphosphate which apparently functions to dissolve the otherwise insoluble polyphosphates and enables the production of more soluble metal complexes.

That complex alkali metal heavy metal polyphosphates comparable to sodium cupric pyrophosphate in their general structures are formed in each case is indicated by the fact that the apparent reaction products have entirely different and more beneficial effects than the original reactants when used alone.

The amount of agent used in a particular water or other coolant will depend on a number of different factors such as the degree of contamination by the algae, the rate of circulation of the water, the character of the apparatus through which the water is circulated, the character of the water, the temperature extremes to which it may be subjected, the material from which the cooling pond walls may be formed, and the materials of construction of the equipment contacted by the treated waters. In the case of old waters, a high initial charge followed by reduced charges at frequent intervals may be desirable. With fresh waters, only small charges at intervals may be required. For algae control in general, sufficient of the complex to produce a residual concentration of the heavy metal of about 2.5 to 10 parts per million, preferably about 5 p. p. m., is believed satisfactory. The mercury and silver compounds are considered to possess a more sustained killing effect and to be effective in lower concentrations.

Since different species of algae may be encountered, some of which are more affected by some complexes than others, it may be desirable in some cases to charge the water with a mixture of different complexes in accordance with the character of the algae content. In all cases, it is desirable that the character and amount of the complex or complexes are so selected that corrosion of the associated apparatus is held to a minimum.

While the term "reaction products" as used herein is intended primarily to include the apparently complex reaction products, it is also intended to include any other of the reaction products that may contribute to the improved results obtained.

Obviously many modifications and variations of the invention as above set forth may be made without departing from the spirit and scope thereof, and therefore only such limitations should be imposed as are indicated in the appended claims.

I claim:

1. A process for inhibiting the growth of algae and the like in industrial waters, such as are circulated through cooling ponds, heat exchangers and the like comprising the steps of reacting an alkali metal pyrophosphate in an aqueous medium with a compound containing a heavy metal selected from the group consisting of copper, mercury, nickel, silver, zinc, manganese and cadmium, said reactants being used in approximately the stoichiometric proportions to replace at least one of said alkali metal components of said pyrophosphate with the resulting formation of a complex alkali metal-heavy metal phosphate, and charging the resultant reaction products to said water in an amount to provide a residual concentration of the heavy metal-containing ion of about 2.5 to 10 parts per million.

2. A process according to claim 1 in which a reaction product containing sodium cupric pyrophosphate is charged to said industrial water.

3. A process according to claim 1 in which a reaction product containing sodium cupric pyrophosphate is charged to said industrial water in an amount to provide a residual concentration of copper-containing ion of about 5 parts per million.

WILLIAM W. ROBINSON, Jr.

References Cited in the file of this patent

UNITED STATES PATENTS

| Number | Name | Date |
| --- | --- | --- |
| 2,209,129 | Mengele et al. | July 23, 1940 |
| 2,237,045 | Booth | Apr. 1, 1941 |
| 2,337,856 | Rice et al. | Dec. 28, 1943 |
| 2,400,677 | Allen | May 21, 1946 |
| 2,400,863 | Gelfand | May 21, 1946 |

FOREIGN PATENTS

| Number | Country | Date |
| --- | --- | --- |
| 13,199 | Great Britain | of 1894 |

OTHER REFERENCES

Journal Chemical Society, 1936, pages 1412–1429.